United States Patent [19]
Kanbar et al.

[11] Patent Number: 5,289,522
[45] Date of Patent: Feb. 22, 1994

[54] DENTAL X-RAY AIMING DEVICE

[76] Inventors: Maurice S. Kanbar, 4 E. 77th St., New York, N.Y. 10021; Albert Kolvites, R.R. 3 Box 117A Yeager Rd., Mountaintop, Pa. 18707; Robert J. Cohn, 61 Sterling Ave., Dallas, Pa. 18612

[21] Appl. No.: 977,241

[22] Filed: Nov. 16, 1992

[51] Int. Cl.⁵ .............................................. G03B 42/02
[52] U.S. Cl. ..................................... 378/170; 378/168
[58] Field of Search ........................ 378/168, 169, 170

[56] References Cited

U.S. PATENT DOCUMENTS

| | | | |
|---|---|---|---|
| 1,631,497 | 6/1927 | Marler | 378/169 |
| 4,626,216 | 12/1986 | Strong-Grainger | 378/168 |
| 4,805,201 | 2/1989 | Strong-Grainger | 378/168 |
| 4,847,884 | 7/1989 | Dove | 378/168 |
| 4,852,143 | 7/1989 | Scheier et al. | 378/168 |
| 5,044,008 | 8/1991 | Jackson | 378/168 |

*Primary Examiner*—Craig E. Church
*Attorney, Agent, or Firm*—Michael Ebert

[57] ABSTRACT

A dental X-ray aiming device adapted to place an X-ray film packet having sharp edges at a proper position in the oral cavity of a patient. The device includes a packet holder that serves to shield the sharp edges of the packet to avoid direct contact with tissue within the oral cavity and the resultant discomfort, pain or trauma. The holder is formed by a rectangular frame of resilient plastic material within which the packet is socketed, and a bite block joined to the front of the frame which, when clenched between the teeth of the patient, then places the held film packet behind a tooth region to be examined. The device also includes a distance-calibrated guide rod which is detachably coupled to the bite block, and a sighting ring adapted to receive the nose cone of an X-ray unit, the ring being slidable along the rod to a desired position thereon, whereby an X-ray beam is projected from the nose cone in accurate relationship to the film packet.

14 Claims, 3 Drawing Sheets

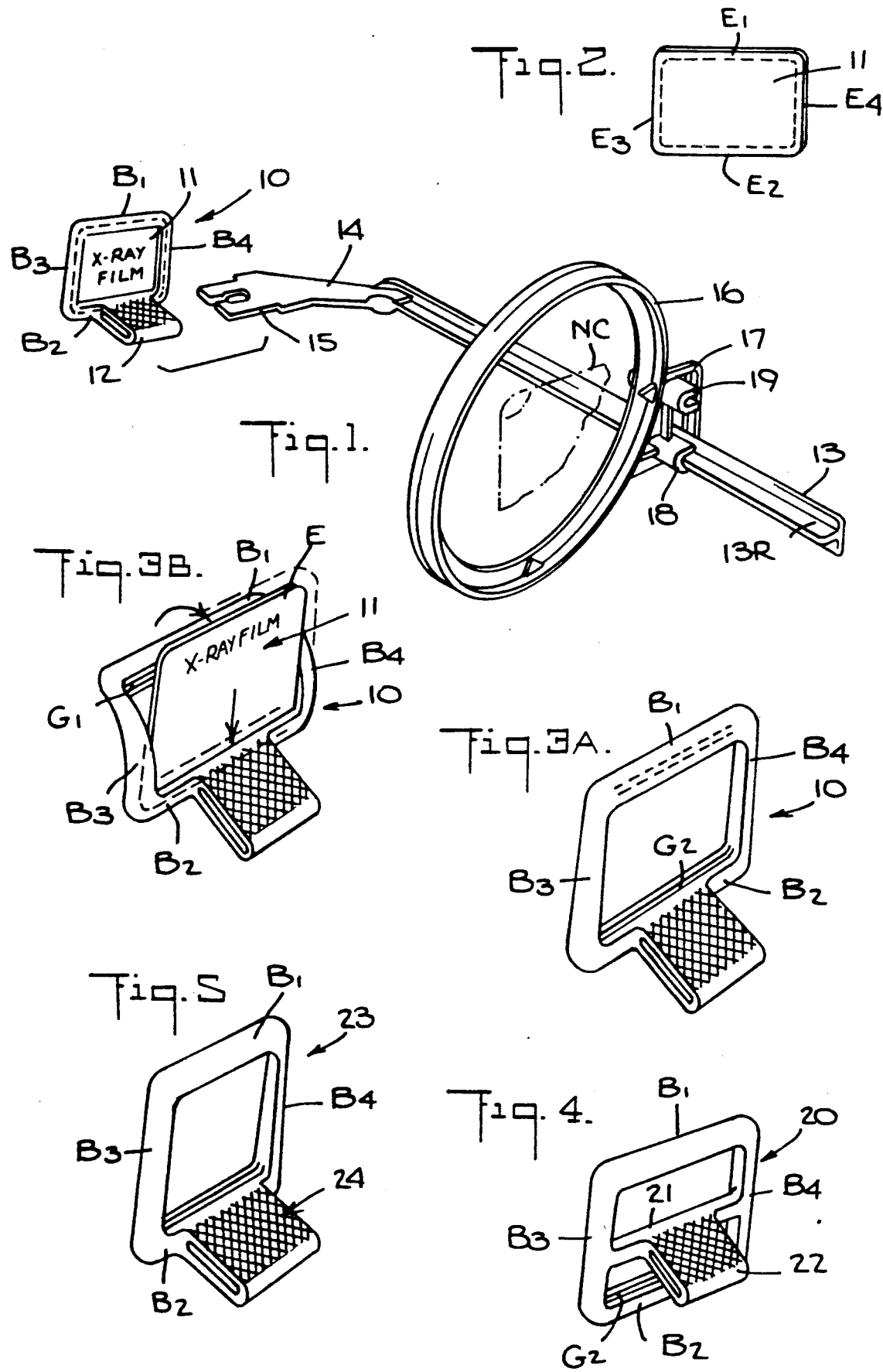

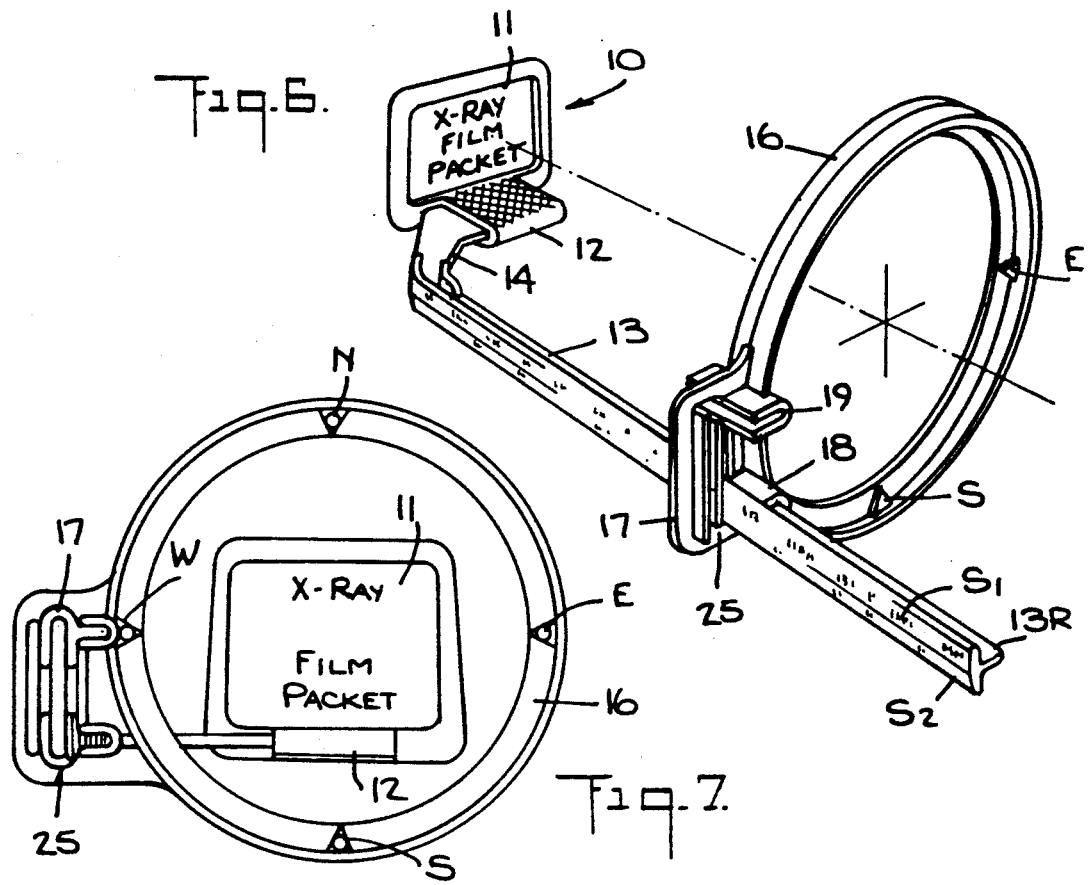
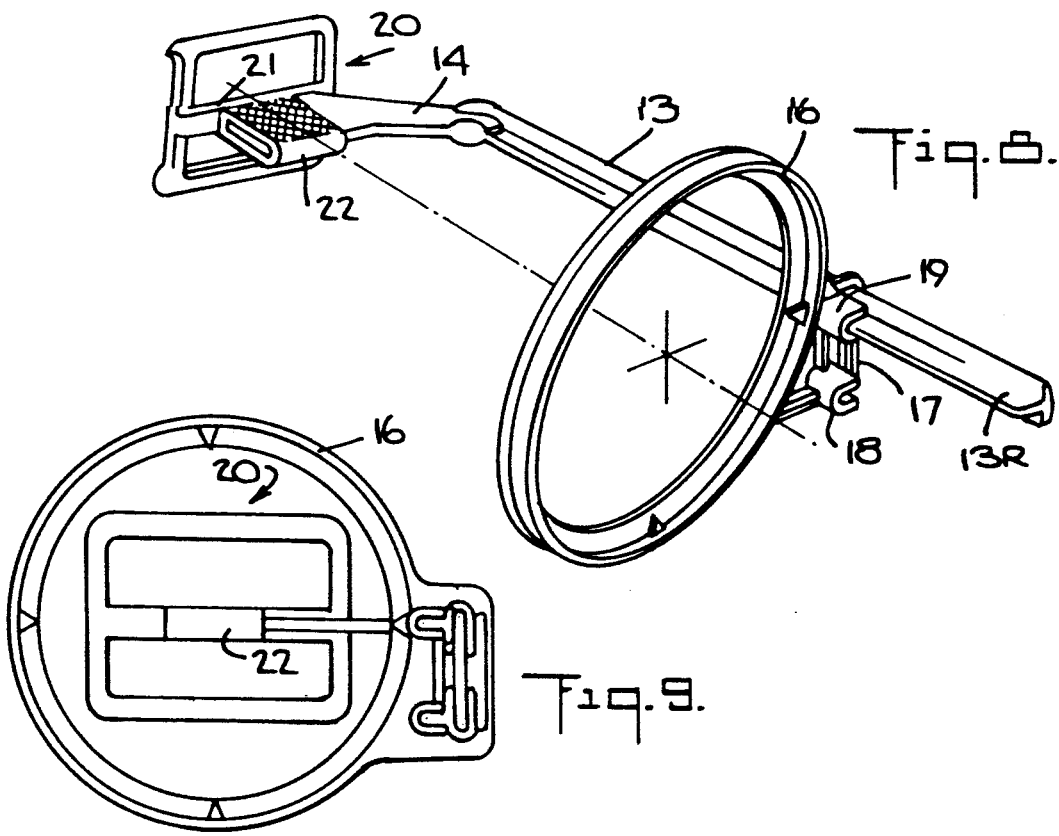

DENTAL X-RAY AIMING DEVICE

BACKGROUND OF INVENTION

1. Field of Invention:

This invention relates generally to dental X-ray aiming devices adapted to place an X-ray film packet having sharp edges in the oral cavity of a patient at a proper position therein before the packet is exposed to X-rays, and in particular to a device of the type which includes a holder for the film packet that serves to shield the sharp edges thereof so as to avoid direct contact with tissue within the oral cavity and the resultant discomfort, pain or trauma.

2. Status of Prior Art:

Dental X-ray technology affords useful information regarding the structural integrity of the teeth and its supporting tissue. Commonly used for the purpose of producing a radiograph of a tooth region is a film packet in which a chip of X-ray film is disposed within a rectangular plastic carrier that is permeable to X-rays but not to light rays, so that the film housed therein is exposed only when subjected to X-rays.

In practice, the film packet is placed in a patient's oral cavity behind a tooth region to be X-rayed and is then exposed to radiation passing through the region onto the emplaced film packet. In order to minimize distortion of the radiograph, a "paralleling" technique is used in which the film packet is maintained in parallel relation to the long axis of the teeth.

To this end, use is made of a dental X-ray aiming device that includes a film holder having integral therewith a bite block that projects from the rear of the holder and is clenched between the teeth of the patient. The film packet, which is held in the holder behind the tooth region to be X-rayed, is then substantially parallel with the long axis of the teeth.

Detachably coupled to the bite block of the film holder is a guide rod on which is slidable a sighting ring through which is projected an X-ray beam that is directed toward the film packet held behind the tooth region of interest. One such dental X-ray aiming device is disclosed in the U.S. Pat. No. 4,965,885, to Fuhrmann. In this device, the film packet is inserted in a holder formed by a plate whose upper edge is U-shaped and a lower clamp that acts to ensure a better hold and exact positioning of the film packet. A similar dental X-ray aiming device is disclosed in the Updegrave U.S. Pat. No. 3,473,026.

In a typical film packet, the flat, rectangular plastic film carrier which envelops the X-ray film chip is heat-sealed around its perimeter to provide thin, flexible edges so that the packet is bendable. These edges are relatively sharp; hence when the film packet is placed within the oral cavity of a patient, its edges then engage soft tissue and may cause discomfort, intensive pain, or even trauma when pressed into the tissue by a dental operator seeking to properly place the film packet so as to obtain a good radiograph.

Even greater difficulty is experienced with children or adults having small mouths, as well as with those adults who exhibit sensitive bony projections inside the mandible and the hard palate. Yet if the film packet is shifted within the oral cavity to a more comfortable position, then the film packet may not be properly placed. Or if the patient will only bite gently on the bite block until the film packet meets resistance by soft tissue, then the film packet will not be firmly held in place, and the quality of the resultant radiograph may be adversely affected.

In order to overcome this problem, the U.S. Pat. Nos. 4,626,216 and 4,805,201, to Strong-Grainger, provide a soft, foam plastic padding for a dental X-ray film packet. The soft padding is either incorporated into the structure of the film packet or takes the form of a separate pad for attachment to a standard film packet.

The U.S. Pat. No. 5,044,008, to Jackson, discloses a frame-like, foam plastic cushion for a dental film packet. In the U.S. Pat. No. 4,847,884, to Dove, a holder is provided in the form of a soft cylinder having a slot therein to receive one edge of the film packet.

Also of background interest are the following patents:

Van Aken—U.S. Pat. No. 4,707,847
McAuslan—U.S. Pat. No. 4,592,084
Updegrave—U.S. Pat. No. 3,003,062

SUMMARY OF INVENTION

In view of the foregoing, the main object of this invention is to provide a dental X-ray aiming device having a holder adapted to place an X-ray film packet having sharp edges at a proper position in the oral cavity of a patient, the holder acting to shield the edges of the packet so that they do not come in contact with tissue within the oral cavity, thereby avoiding discomfort, pain or trauma to the patient.

More particularly, an object of this invention is to provide an improved dental X-ray aiming device having a holder in the form of a rectangular frame formed of flexible, synthetic plastic material into which the film packet may be readily inserted or withdrawn, the frame having rounded branches and serving to shield the sharp edges of the packet from contact with tissue in the oral cavity.

Also an object of the invention is to provide in a dental X-ray aiming device having a frame-type film holder to whose front is joined a bite block which, when clenched between the teeth of the patient, places the holder and the film packet held therein behind the tooth region to be examined. In one embodiment of the holder, the bite block is joined to the center of the frame, in a second embodiment it is joined to one side of the frame, and in a third embodiment it is joined to one end of the frame, the orientation of the film packet depending on how the bite block is joined to the frame.

Yet another object of the invention is to provide an aiming device of the above type having detachably coupled to the bite block of the holder a guide rod having a distance scale on which is slidable a sighting ring whose position is adjustable to set the distance between the nose cone of an X-ray unit and the film packet, the distance set depending on the focal length of the X-ray unit being used.

A significant feature of the invention resides in a slider on which the sighting ring is supported, the slider having a pair of shoes, one above the other, adapted to ride on the guide rod, whereby, depending on which shoe is engaged, the sighting ring can be properly oriented with respect to the film packet holder being used to ensure accurate alignment of the X-ray tube with the film packet.

Briefly stated, these objects are attained in a dental X-ray aiming device adapted to place an X-ray film packet having sharp edges at a proper position in the oral cavity of a patient. The device includes a packet holder that serves to shield the sharp edges of the packet to avoid direct contact with tissue within the oral cavity and the resultant discomfort, pain or trauma. The holder is formed by a rectangular frame of resilient plastic material within which the film packet is socketed, and a bite block joined to the rear of the frame which, when clenched between the teeth of the patient, then places the held film packet behind a tooth region to be examined.

The device also includes a distance calibrated guide rod which is detachably coupled to the bite block, and a sighting ring adapted to receive the nose of an X-ray unit, the ring being slidable along the rod to a desired position thereon, whereby an X-ray beam is projected from the nose cone in accurate relationship to the film packet.

BRIEF DESCRIPTION OF DRAWINGS

For a better understanding of the invention as well as other objects and further features thereof, reference is made to the following detailed description to be read in conjunction with the accompanying drawing, wherein:

FIG. 1 is a perspective view of a dental X-ray aiming device in accordance with the invention, the holder for the film packet, which is adapted to hold a film packet so that it is horizontally oriented, being shown detached from its supporting rod;

FIG. 2 shows a standard film packet;

FIG. 3A separately shows the holder of FIG. 1 without the film packet;

FIG. 3B shows the same holder with the film packet in the process of being installed therein;

FIG. 4 shows a second embodiment of a holder, the holder being adapted to hold the film packet so that it is horizontally oriented and centered interproximally with respect to the tooth region being examined;

FIG. 5 shows a third embodiment of the holder, this being adapted to hold the film packet so that it is vertically oriented with respect to the tooth region;

FIG. 6 is a perspective view of the assembled dental X-ray aiming device whose sighting ring is aligned with a horizontally-oriented film packet;

FIG. 7 is a transverse section taken through the supporting rod for the film packet holder and the slider on which a sighting ring is anchored, and showing the aligned relationship between the ring and a horizontally-oriented film packet;

FIG. 8 is a perspective view of the assembled dental X-ray aiming device whose sighting ring is aligned with a a bite wing oriented film packet;

FIG. 9 is a transverse section taken through the supporting rod for the holder and the slider on which the sighting ring is supported and which shows the aligned relationship between the ring and the bite wing oriented film packet.

DESCRIPTION OF INVENTION

Figure 10:
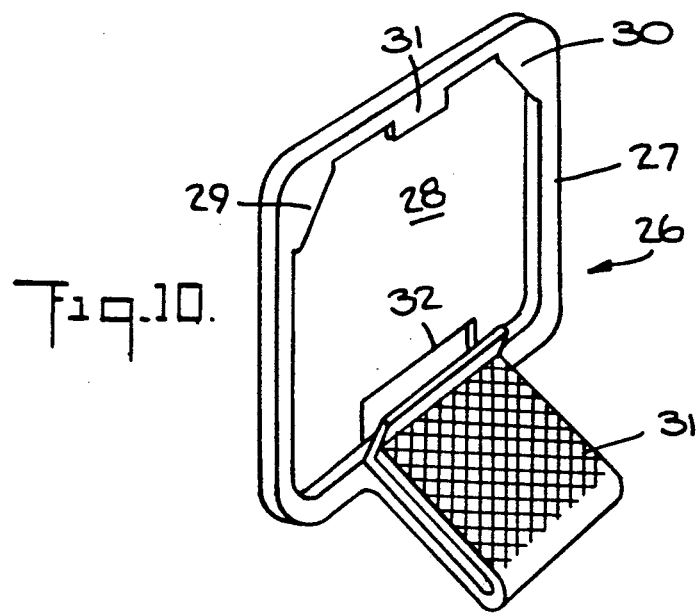
FIG. 10 is a perspective view, as seen from the front, of a fourth embodiment of a holder for an X-ray film packet.

Referring now to FIG. 1, a dental X-ray aiming device in accordance with the invention includes a holder 10 having installed therein a standard X-ray film packet 11. As shown separately in FIG. 2, film packet 11 has housed within a rectangular plastic carrier an X-ray film chip, the periphery of the carrier being heat-sealed to define relatively sharp upper and lower side edges $E_1$ and $E_2$ and left and right end edges $E_3$ and $E_4$. Such packets are available in various sizes, and the holder therefor must therefore be dimensioned accordingly.

Holder 10, as shown separately in FIGS. 3A and 3B, includes a frame molded of synthetic, plastic resilient material defined by upper and lower side branches $B_1$ and $B_2$, and left and right end branches $B_3$ and $B_4$. All of the branches of the frame are rounded, and so are the four corners of the frame, so that the outer frame surfaces are altogether free of protuberances, indentations or sharp edges.

Indented along the inner wall of upper side branch $B_1$ is a groove $G_1$, and indented along the inner wall of lower side branch $B_2$ is a groove $G_2$. These grooves are dimensioned to receive the corresponding upper and lower edges $E_1$ and $E_2$ of film packet 11.

FIG. 3A shows holder 10 with film packet 11 omitted, while FIG. 3B shows how the film packet is installed in the frame of the holder. This is done by bending the frame back and then inserting the lower side edge $E_2$ of the film packet into the exposed lower groove $G_2$ of the lower side branch $B_2$. Then upper branch $B_1$ of the frame is rolled over upper side edge $E_1$ of the film packet so that this edge is received in groove $G_1$, at which point the film packet is firmly held in the frame.

The frame of the holder, though formed of resilient material, must be soft enough to cushion the film packet when the holder is placed within the oral cavity of the patient, in which condition the branches of the frame shield the edges of the film packet against direct contact with tissue within the oral cavity. But the frame must be rigid enough to normally maintain the installed film packet in a planar state.

Joined to the lower side branch $B_2$ of the holder frame at its front tegral therewith is a block-like, hollow bite block the same plastic material. As so joined to the frame of holder 10, the film packet held therein is horizontally-oriented. The surfaces of bite wing 12 are textured or roughened to allow the teeth to firmly grip the bite wing when it is clenched between the teeth of the patient, so as to place the frame holding the film packet behind a tooth region of interest in the oral cavity of the patient.

Holder 10 is detachably coupled to a guide rod 13 having a coupler arm 14 joined to its leading end. The arm extends laterally from the rod and terminates in a pair of flat, rigid tangs 15. These tangs are received in the hollow of bite wing 123 and serve to maintain the held film packet at right angles to the axis of the guide rod.

The embodiment of bite wing holder 20 shown in FIG. 4 is adapted to hold a film packet 11 in a frame composed of branches $B_1$ to $B_4$ horizontally and centered with respect to the tooth region being examined. To this end, the frame is provided with a cross piece 21 which bridges end branches $B_3$ and $B_4$ of the frame at their midpoints and is integral therewith. Joined to cross piece 21 is a block-like bite wing 22.

Holder 11, which is shown in FIG. 1, is of the posterior type, bite block 12 being joined to the lower side branch $B_2$ so that the film packet 11 held in the frame is then horizontally oriented and is placed above the bite block.

The embodiment of holder 23 shown in FIG. 5 is of the anterior type, for its bite block 24 is joined to end branch B₃ of the frame so that the film packet held in the frame is vertically oriented and is placed above the bite block. In this embodiment, the grooves are in the end branches of the frame, not in the side branches, as in FIGS. 3A and 3B.

Referring back to FIG. 1, it will be seen that slidable on guide rod 13 is a sighting ring 16. Sighting ring 16 is supported on a slider 17 having a pair of shoes 18 and 19, one above the other, the shoes being adapted to run along a side rail 13R extending the full length of guide rod 13. Thus when shoe 18 of slider 17 engages rail 13R, sighting ring 16 is at a higher position than when shoe 19 engages this rail.

The sighting ring position shown (shoe 18) is appropriate to holders 10 and 23 in which film packet 11 is installed. The use of shoe 19 centers the ring onto the bite wind holder 20, for then the center of sighting ring 16 is in axial alignment with the center of film packet 11.

In practice, received within sighting ring 16 is nose cone NC of an X-ray unit which shoots an X-ray beam toward the film packet so as to produce a radiograph of the tooth region of interest. The distance between the film packet and the sighting ring is adjusted to the proper length by sliding the sighting ring along the distance-calibrated guide rod, the distance set depending on the focal length of the X-ray unit being used.

FIGS. 6 and 7 illustrate the dental X-ray aiming device when it is assembled and in operative condition. It is to be noted that on the side of guide rod 13 opposite rail 13R are the indicia of parallel metric and inch scales $S_1$ and $S_2$ to indicate the distance of sighting ring 16 from the plane of the film packet.

Also, as best seen in FIG. 7, sighting ring 16 is provided with arrows N, S, E and W at the cardinal compass points which act as center line indicators. Looking through the sighting ring, the center of film packet 11 must be in alignment with the intersection of the horizontal and vertical centering lines. Slider shoes 18 and 19, on which sighting ring 16 is supported, are preferably provided with a leaf spring 25 that engages the guide rod to maintain the sighting ring at its adjusted position along the rod.

In FIGS. 6 and 7, it is lower shoe 18 of the slider which rides on rail 13R of guide rod 13 in order to raise the sighting ring so that it is properly aligned with horizontally-oriented film packet 11.

But in the assembled aiming device shown in FIGS. 8 and 9, use is made of the film packet holder 20 which holds the film horizontally and centered with respect to the tooth region being examined. When so arranged in order to properly align sighting ring 16 with the center of the film packet, it is necessary to somewhat lower the sighting ring, and to this end it is slider shoe 19 which runs on rail 13R.

Figure 11:
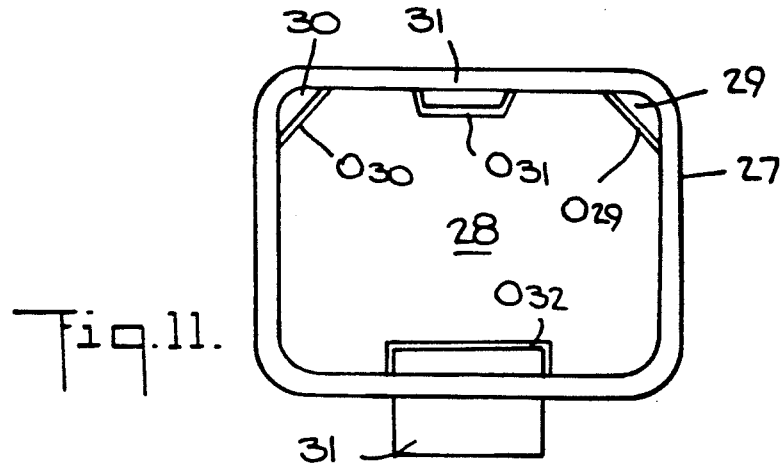
FIG. 11 is a rear view of this holder.
Figure 12:
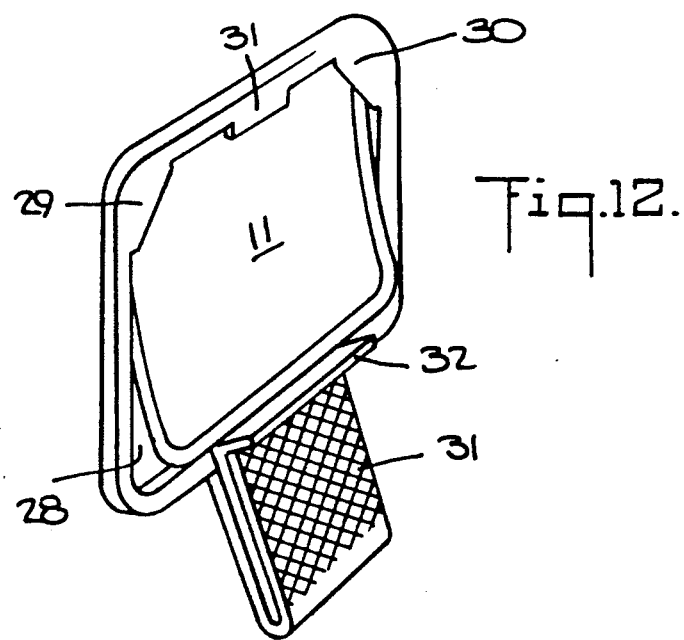
FIG. 12 shows the film packet being inserted in the holder.

In holder 26 shown in FIGS. 10 to 12 for an X-ray film packet 11, the holder, which is molded of soft, resilient, synthetic plastic material, such as polyurethane, includes a rectangular frame 27 formed of horizontal and vertical branches having rounded surfaces, the corners of the branches being rounded, so that when the holder is placed with the oral cavity of a patient, no sharp surfaces are presented to soft tissue in the oral cavity. The frame is closed at its rear side by a backing panel 28 against which the film packet rests when it is socketed within the frame.

As best seen in FIG. 10, projecting inwardly at the front side of the frame at its upper left corner is a small tab 29, a similar tab 30 being formed at the upper right corner. Also projecting inwardly at the front side of frame 27 from its upper branch midway between tabs 29 and 30 in a small tab 31. Behind these tabs, as best seen in FIG. 11, are openings $O_{29}$, $O_{30}$ and $O_{31}$ formed in backing panel 28 to facilitate insertion into the frame of the upper edge of the film packet so that it lies under the tabs.

Integral with the lower horizontal branch of frame 27 and projecting forwardly therefrom is a rectangular bite block 31. This block is hollow so as to receive the tangs 15 (see FIG. 1) extending at right angles from the end of rod 13. Bite block 31 has formed on its inner end a vertical ledge 32, which is normally parallel to rear panel 28, to define a space therebetween for receiving the lower edge of the film packet. An opening $O_{32}$ is formed in the rear panel in alignment with ledge 32.

As shown in FIG. 12, in order to socket the film packet in the flexible frame of the holder, the upper edge of the film packet is first inserted in the frame under tabs 29, 30 and 31. The flexible bite block 31 is then flexed down to permit the film packet to lie against rear panel 38. The bite block is then released to assume its normal position to cause ledge 32 to engage the lower edge of the film packet to hold it in place within the frame. After the film packet is exposed and the film holder removed from the oral cavity, to withdraw the film packet from the frame, the bite block is again flexed so that the lower edge of the film packet is released from the frame and the film packet can then be removed from the frame.

While there have been shown and described preferred embodiments of the invention in accordance with the invention, it will be appreciated that many changes and modifications may be made therein without, however, departing from the essential spirit thereof.

We claim:

1. A dental X-ray aiming device adapted to position a rectangular film packet having relatively sharp edges in the oral cavity of a patient, said device comprising:

(a) a packet holder that shields the edges of the packet to avoid direct contact with tissue in the oral cavity and a resultant discomfort or pain, said holder including a rectangular frame formed of resilient, synthetic plastic material defining a pair of side branches and a pair of end branches within which the packet is socketed, and a bite block joined to the frame at its front and projecting therefrom, the bite block, when clenched between the teeth of the patient, then positioning the film packet behind a tooth region of interest;

(b) a guide rod detachably coupled to the bite block of the holder to place the film packet in a plane at right angles to the rod; and (c) a sighting ring slidable on the guide rod to accommodate a nose cone of an X-ray unit to project an X-ray beam toward the film packet to produced a radiograph of the tooth region.

2. A device as set forth in claim 1, wherein the branches and the corners of the frame are rounded.

3. A device as set forth in claim 1, wherein said frame is provided with a cross piece bridging the end branches at their midpoints, said bite block being joined to said cross piece.

4. A device as set forth in claim 1, wherein said bite block is joined to one of the side branches, whereby the film packet is then horizontally oriented.

5. A device as set forth in claim 1, wherein said bite block is joined to one of said end branches, whereby the film packet is then vertically oriented.

6. A device as set forth in claim 1, wherein said bite block is hollow and said rod has a coupling arm which extends laterally from one end of said rod and terminates in a pair of tangs that is insertable into the hollow of the bite block.

7. A device as set forth in claim 1, wherein said sighting ring is supported on a slider that runs along the rod.

8. A device as set forth in claim 7, wherein said slider has a pair of shoes, one above the other, and said rod is provided along its length on one side thereof with a rail engaged by a selected one of said shoes to position the sighting ring at a raised or lowered position.

9. A device as set forth in claim 8, wherein said slider shoes include a leaf spring to engage said rail and hold the ring at a selected position on the rod.

10. A device as set forth in claim 9, wherein said rod is provided on the other side thereof with a distance scale.

11. A device as set forth in claim 1, wherein said ring is provided with four arrows, 90 degrees apart, to establish center lines.

12. A device as set forth in claim 1, wherein one of said pair of branches is provided with inner grooves to receive corresponding inner edges of the film packet, whereby the packet may be socketed in the grooves or withdrawn therefrom by flexing the frame.

13. A device as set forth in claim 1, wherein said frame is provided at its rear with a panel which backs the film packet inserted in the frame.

14. A device as set forth in claim 3, wherein said frame includes at its upper corners inwardly-projecting tabs which overlie corresponding corners in the upper edge of the film packet, and said bite block is flexible and is provided at its inner end with a ledge which, when the bite block is unflexed, overlies the lower edge of the film packet to retain the packet in the frame.

* * * * *